No. 670,877. Patented Mar. 26, 1901.
H. K. HESS.
PRIMARY BATTERY AND PROCESS OF REGENERATING SAME.
(Application filed Dec. 21, 1900.)
(No Model.)
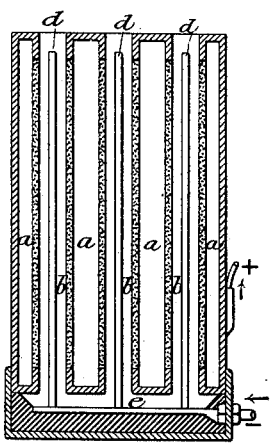
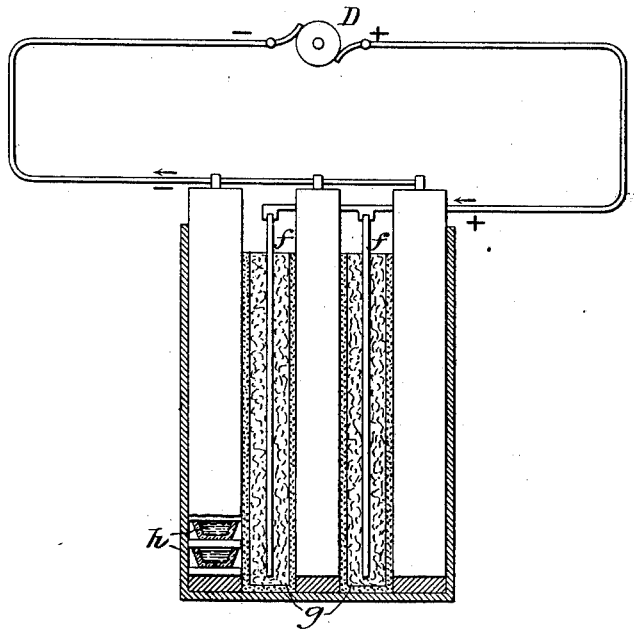
Witnesses:
Inventor:-
Henry K. Hess.
by his Attorneys

United States Patent Office.

HENRY K. HESS, OF PHILADELPHIA, PENNSYLVANIA, ASSIGNOR TO HERMAN J. DERCUM, TRUSTEE, OF SAME PLACE.

PRIMARY BATTERY AND PROCESS OF REGENERATING SAME.

SPECIFICATION forming part of Letters Patent No. 670,877, dated March 26, 1901.

Application filed December 21, 1900. Serial No. 40,679. (No model.)

*To all whom it may concern:*

Be it known that I, HENRY K. HESS, a citizen of the United States, residing in Philadelphia, Pennsylvania, have invented certain Improvements in Primary Batteries and Processes of Regenerating the Same, of which the following is a specification.

My invention relates to certain improvements in primary batteries and processes of regenerating the same.

The object of my invention is to minimize the volume of battery fluid which is handled in returning the fluid to the central station or regenerator and to obtain a large amount of energy from a small amount of battery fluid. This object I attain as hereinafter set forth.

In carrying out my invention I prepare a battery fluid of high specific gravity for transportation. When this has reached its place of use, I dilute the same with water to any desired density, placing it in the cells of a primary battery of any suitable type, one type I may use being known as a "two-liquid" primary battery. After the battery fluid is exhausted in the battery-cell in the production of an electric current it is returned to a central station or regenerating plant for regeneration. The liquid is then regenerated, preferably by the use of electrolysis, using a dynamo. After the liquid has been regenerated the water in the solution is vaporized out until the fluid is reduced to its original proportioned volume and increased to its original density. It is now ready for reshipment, to be used in the same manner as previously described in a battery-cell, thus producing a cycle of dilution and vaporization, exhaustion and regeneration. In some instances the water of dilution may be vaporized out of the battery fluid until a salt is formed.

In the accompanying drawings, Figure 1 is a view of a primary battery of the type in which my invention can be carried out. The cell is divided into compartments $a$ and $b$ by porous partition-plates, and in the compartments $b$ are the plates $d$, connected to a terminal plate $e$ at the base.

In Fig. 2 I have shown one form of regenerator in which I may use porous containers separated by carriers for a series of mercury-holders. The plates $f$ in the porous cups $g$ are connected to the positive pole of a dynamo D, the mercury-cups $h$ being connected to the negative pole, as shown in the diagram, Fig. 2; but it will be understood that other means may be used for carrying out my invention without departing from the main feature thereof, which relates to a process rather than to an apparatus.

I claim as my invention—

1. The process herein described of treating battery fluids, said process consisting in reducing the density of a concentrated battery fluid with water, and employing said fluid in a battery-cell in the production of an electric current, then regenerating the fluid and vaporizing out the excess water to restore it to its original density, substantially as and for the purpose set forth.

2. The process of treating battery fluid whereby the same may be repeatedly used in the production of an electric current, said process consisting in employing the liquid in a battery-cell to produce current and thereby exhausting it, chemically changing the exhausted fluid back to its original condition, concentrating the said fluid and afterward diluting the same when it is desired to again use it in the production of an electric current, substantially as described.

In testimony whereof I have signed my name to this specification in the presence of two subscribing witnesses.

HENRY K. HESS.

Witnesses:
WILLIAM E. BRADLEY,
JOS. H. KLEIN.